Sept. 27, 1960 E. G. SCHMIEDING ET AL 2,954,330
DISTILLATION COLUMN
Filed Aug. 8, 1955

INVENTORS
JAMES E. WALL
BY EARL G. SCHMIEDING
ATTORNEYS

United States Patent Office 2,954,330
Patented Sept. 27, 1960

2,954,330

DISTILLATION COLUMN

Earl G. Schmieding and James E. Wall, Corpus Christi, Tex., assignors to Celanese Corporation of America, New York, N.Y., a corporation of Delaware Filed Aug. 8, 1955, Ser. No. 527,088

8 Claims. (Cl. 202—158)

This invention relates to a distillation column and relates more particularly to a high vacuum distillation column having a small pressure drop along the length of the column.

The separation or purification of high-boiling, heat-sensitive materials from a liquid mixture containing the same is frequently carried out by subjecting the said liquid mixture to a high vacuum distillation. While it is possible in this way to achieve a good separation or purification of the materials involved, a number of problems arise when, as is frequently the case, the pressure drop along the distillation column for each theoretical plate is relatively high, particularly at high throughputs. Under these conditions, it is not possible in many cases to achieve the desired separation or purification of the materials in a single column containing many theoretical plates since this would raise the pressure in the base of the column excessively and require the temperature at said point to be increased to a level where damage to the heat-sensitive material occurs. This means that frequently a single column or pass cannot be used to carry out the desired separation or purification. Instead, a plurality of columns or passes must be used, increasing the cost of such operation.

It is an important object of this invention to provide a distillation column which will be free from the foregoing and other disadvantages.

A further object of this invention is to provide a high vacuum distillation column which will have a small pressure drop per theoretical plate even at high throughputs.

Other objects of this invention will be apparent from the following detailed description and claims.

According to the present invention, there is provided a distillation column comprising a casing through which a stream of the liquid being distilled flows and in which there are positioned one or more foraminous members a portion of which dips into said liquid and is wetted thereby. Means are provided for rotating or otherwise moving said foraminous member so as to bring the entire surface thereof into contact with the liquid. There are also provided in said column means for forcing the vapors of the liquid being distilled to pass repeatedly through that portion of the wet foraminous member that is not immersed in the liquid whereby an effective fractionation of said vapors will occur. One such means for forcing the vapors through the foraminous members may comprise a plurality of baffles, while another of such means of such means may comprise the foraminous members themselves. For example, the foraminous members may extend across the entire cross-sectional area of the column so that the vapors must pass therethrough as they travel from one end of the column to the other.

Preferred embodiments of the apparatus of this invention are shown in the accompanying drawing wherein.

Figure 1:
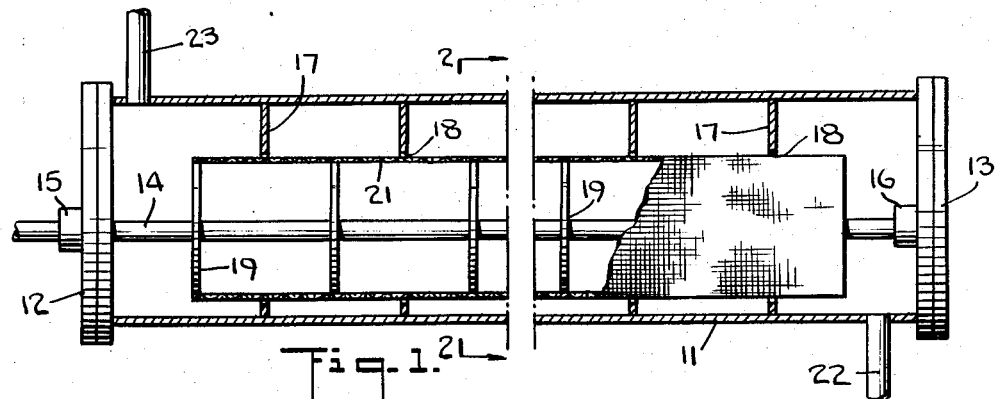
Fig. 1 is a cross-sectional view of one form of distillation column.
Figure 2:
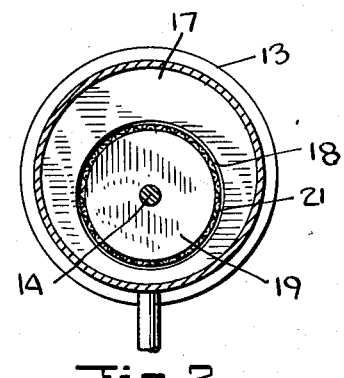
Fig. 2 is a cross-sectional view taken along the line 2—2 in Fig. 1 in the direction of the arrows.

Referring now to the drawing and specifically to Figs. 1 and 2 thereof, the reference numeral 11 designates a cylindrical casing positioned horizontally and provided with end plates 12 and 13. A rotatable shaft 14 driven by any suitable means (not shown) extends longitudinally of the casing 11 and is supported by bushings 15 and 16 secured to the end plates 12 and 13, respectively. As shown most clearly in Fig. 2 of the drawing, the shaft 14 is positioned on a line parallel to but spaced downwardly from the longitudinal axis of the casing 11. Located internally of the casing 11 and secured to the inner wall thereof are a plurality of stationary baffles 17, each provided with a circular opening 18 concentric with the shaft 14. A plurality of circular baffles 19 are mounted on the shaft 14 in such a manner that there is a baffle 19 between each pair of baffles 17. In addition, there are end baffles 19 positioned outside the end baffles 17. The baffles 19 act as a support for a cylinder 21 of foraminous material, such as wire screening, perforated metal, or the like, encircling the same and substantially filling the openings 18 in the baffles 17. One end of the casing 11 is connected by means of a conduit 22 to a reboiler or other source of vapors to be fractionated (not shown) while the other end of the casing 11 is connected by means of a conduit 23 to a condenser and vacuum line (not shown).

During operation, reflux is entered into the casing 11 through the conduit 23 and flows to the conduit 22 along the bottom of said casing over the baffles 17 wetting the lowermost portion of the cylinder 21. The shaft 14 is driven, rotating the cylinder 21 and thereby causing the entire surface of the said cylinder to be wetted. Because of the specific location of the cylinder 21 away from the center of the casing 11, only a limited amount of liquid need be present in the said casing to permit the foraminous material to be wetted. Vapors enter the casing 11 through the conduit 22 and are forced by the arrangement of the baffles 17 and 19 to flow into and out of the cylinder 21, repeatedly contacting the thin film of liquid carried by the foraminous material of which said cylinder is constructed. In this way, there is obtained a highly efficient fractionation of said vapors. Moreover, because of the relative freedom from obstructions in the path of the vapors, the pressure drop through the column is small even at high throughputs.

Figure 4:
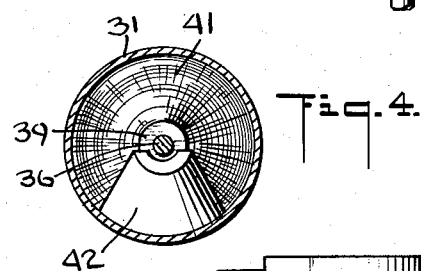
Fig. 4 is a cross-sectional view taken along the line 4—4 in Fig. 3 in the direction of the arrows.
Figure 3:
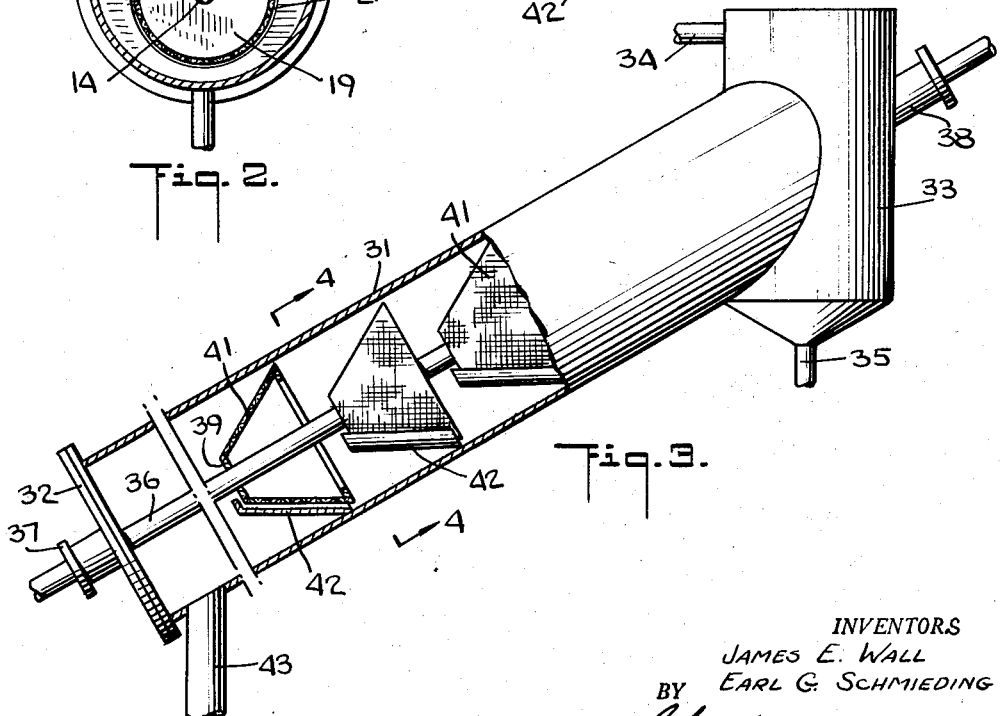
Fig. 3 is a side elevation, partly in cross-section, of another form of distillation column.

Another form of distillation column is shown in Figs. 3 and 4 of the drawing wherein the reference numeral 31 designates a cylindrical casing inclined upwardly and provided at its lower end with an end plate 32. At its upper end, the casing 31 leads into a condenser 33 which is connected by means of a conduit 34 to a vacuum line and from which condensed product may be withdrawn by means of a conduit 35. A rotatable shaft 36, driven by any suitable means (not shown) extends longitudinally along the axis of the casing 31 and is supported by a bushing 37 secured to the end plate 32 and a bushing 38 secured to the condenser 33. Mounted on the shaft 36 are a plurality of discs 39 to the outer edges of which are attached, frusto-conical members 41 constructed of a foraminous material such as wire screening, perforated metal, or the like, which members 41 extend almost in contact with the walls of the casing 31. Positioned beneath the lowermost portion of each of the frusto-conical members 41 and almost in contact therewith are trays 42 which are shaped to follow the contours of the said frusto-conical members. The trays 42 are so designed and positioned that reflux flowing down the casing 31 will be caught by the said trays and will then overflow from one tray down to the next. The lower end of the casing 31 is connected by means of a conduit 43 to a reboiler or other source of vapors to be fractionated (not shown).

During operation, reflux enters the casing 31 from the condenser 33 and flows downwardly along the said casing filling the trays 42 and wetting the lowermost portions of the frusto-conical members 41. The shaft 36 is driven, rotating the frusto-conical members 41 and thereby causing the entire surface of the said members to be wetted. Vapors enter the casing 31 through the conduit 43 and flow through the frusto-conical members 41 repeatedly contacting the thin film of liquid carried by the foraminous material of which said members are constructed. There is, accordingly, achieved a highly efficient fractionation of the said vapors. In addition, because of the relatively clear path through which the vapors travel, there is only a small pressure drop in the column even at high throughputs.

The following example is given to illustrate this invention further.

*Example*

A column is constructed as shown in Figs. 1 and 2 of the drawing with a casing 11, three inches in diameter and 24 inches long. Eleven stationary baffles 17 having two-inch openings 18 cut therein are positioned at two inch spacings in the said cylinder. There are fixed to the shaft 14 twelve baffles 19, each two inches in diameter and positioned at two-inch spacings, and a cylinder 21 of 20 mesh wire screening is mounted on the baffles 19. The shaft 14 is rotated at 180 r.p.m. and the mixture methylethylpyridine-methylvinylpyridine is distilled through the column. With the pressure in the condenser at 5 mm. Hg and a throughput of 1.2 pounds of vapor per hour, the column has 5.2 theoretical plates and a total pressure drop of 1.7 mm. Hg. When the throughput of vapors is increased to two pounds per hour, the number of theoretical plates in the column is 4.5 and the pressure drop through the column is 2.5 mm. Hg.

It is to be understood that the foregoing detailed description is merely given by way of illustration and that many variations may be made therein without departing from the spirit of our invention.

Having described our invention, what we desire to secure by Letters Patent is:

1. A distillation column comprising a casing having a liquid inlet and a liquid outlet and through which casing a stream of the liquid being distilled flows away from said liquid inlet and towards said liquid outlet, a foraminous member positioned in said casing and having a portion thereof immersed in said liquid to be wetted thereby, means for moving said foraminous member to bring the entire surface thereof into contact with the liquid to be wetted thereby, by immersing successive porions of said foraminous member in said liquid during the course of its movement, means for causing vapors of the liquid being distilled to pass in a direction away from the liquid outlet and towards the liquid inlet and for causing substantially all of said vapors to pass through the thickness of that portion of the said foraminous member which is wetted by but not immersed in the liquid and means for maintaining the composition of the portions of said liquid nearer to the liquid inlet higher in relatively volatile components and lower in relatively non-volatile components than the portions of said liquid nearer to said liquid outlet.

2. A distillation column according to claim 1, wherein said foraminous member extends in axial direction of said casing.

3. A distillation column comprising a casing having a liquid inlet and a liquid outlet and through which casing a stream of the liquid being distilled flows away from said liquid inlet and towards said liquid outlet, a cylindrical member of foraminous material positioned in said casing and having a portion of the foraminous material immersed in said liquid to be wetted thereby, means for rotating said cylindrical member to bring all of said foraminous material into contact with the liquid to be wetted thereby, a plurality of baffles for causing substantially all the vapors of the liquid being distilled to pass in a direction away from said liquid outlet and towards said liquid inlet, passing repeatedly into and out of the cylinder through that portion of the said foraminous material which is not immersed in the liquid and means for maintaining the composition of the portions of said liquid nearer to the liquid inlet higher in relatively volatile components and lower in relatively non-volatile components than the portions of said liquid nearer to said liquid outlet.

4. A distillation column comprising a horizontally positioned cylindrical casing having a liquid inlet and a liquid outlet through which casing a stream of liquid flows, a plurality of stationary baffles positioned internally of said casing forming a plurality of liquid-holding compartments each open at the top thereof through which the liquid flows toward the liquid outlet whereby to maintain the composition of the portions of said liquid in compartments nearer to the liquid inlet higher in relatively volatile components and lower in relatively non-volatile components than the portions of said liquid in compartments nearer to said liquid outlet, a rotatable shaft extended longitudinally through said casing, said stationary baffles having openings therein concentric of said shaft, a plurality of circular baffles secured to said shaft, and a foraminous material secured to said circular baffles to form a horizontally positioned cylindrical member the lower portion of which is immersed in said liquid to be wetted thereby, the construction being such that when the shaft is driven to rotate said cylindrical member all of said foraminous material will be immersed in said liquid to be wetted thereby, and the baffles will cause substantially all the vapors of the liquid being distilled to pass repeatedly into and out of the cylinder through that portion of the foraminous material which is not immersed in liquid.

5. A distillation column of a plurality of theoretical plates comprising a horizontally positioned cylindrical casing having a liquid inlet and a liquid outlet through which casing a stream of liquid flows, a plurality of stationary baffles positioned internally of said casing forming a plurality of liquid holding compartments each open at the top thereof through which the liquid flows toward the reflux outlet whereby to maintain the composition of the portions of said liquid in compartments nearer to the liquid inlet higher in relatively volatile components and lower in relatively non-volatile components than the portions of said liquid in compartments nearer to said liquid outlet, a rotatable shaft extending longitudinally through said casing parallel to the axis of said casing but displaced downwardly therefrom, said stationary baffles having openings therein concentric of said shaft, a plurality of circular baffles secured to said shaft at positions between each pair of stationary baffles, and a foraminous material secured to said circular baffles to form a horizontally positioned cylindrical member almost filling the openings in said stationary baffles the lower portion of which is immersed in said liquid to be wetted thereby, the construction being such that when the shaft is driven to rotate said cylindrical member all of said foraminous material will be immersed in said liquid to be wetted thereby, and the baffles will cause substantially all the vapors of the liquid being distilled to pass repeatedly into and out of the cylinder through that portion of the foraminous material which is not immersed in liquid.

6. A distillation column comprising a casing having a liquid inlet and a liquid outlet and through which casing a stream of the liquid being distilled flows away from said liquid inlet and towards said liquid outlet, at least one foraminous member extending substantially across the free cross-sectional area of said casing and having a portion thereof immersed in said liquid to be wetted thereby, means for rotating said foraminous member to bring the entire surface of the foraminous member into contact with the liquid to be wetted thereby, by immersing successive portions of said foraminous member in said liquid during the course of its rotation, the construction being such that substantially all the vapors of the liquid being distilled will pass through the thickness of that portion of the said foraminous member which is wetted by but not immersed in the liquid.

7. A distillation column comprising a casing having a liquid inlet and a liquid outlet through which casing a stream of the liquid being distilled flows away from said liquid inlet and towards said liquid outlet, a rotatable shaft extending longitudinally of said casing, a plurality of frusto-conical members of foraminous material fixed to said shaft and extending across the free cross-sectional area of said casing, and a plurality of trays one positioned beneath each of the frusto-conical members to catch the liquid and bring the liquid into contact with the foraminous material to wet the said material, the construction being such that when the shaft is driven to rotate the frusto-conical members all of said foraminous material will be immersed in said liquid to be wetted thereby, and substantially all the vapors of the liquid being distilled will pass through those portions of the wetted foraminous material which are not immersed in the liquid.

8. A distillation column comprising a casing having a liquid inlet and a liquid outlet said casing being inclined upwardly at an angle and through which casing a stream of the liquid being distilled flows away from said liquid inlet and towards said liquid outlet, a rotatable shaft extending longitudinally along the axis of said casing, a plurality of frusto-conical members of foraminous material fixed to said shaft and extending across the free cross-sectional area of said casing, and a plurality of trays shaped to follow the contours of the frusto-conical members one positioned beneath the lowermost portion each of the frusto-conical members to catch the liquid and bring the liquid into contact with the foraminous material to wet the said material, the construction being such that when the shaft is driven to rotate the frusto-conical members all of said foraminous material will be immersed in said liquid to be wetted thereby, and substantially all the vapors of the liquid being distilled will pass through those portions of the wetted foraminous material which are not immersed in the liquid.

References Cited in the file of this patent

UNITED STATES PATENTS

| | | |
|---|---|---|
| 804,677 | Sahlin | Nov. 14, 1905 |
| 1,289,421 | Fairbanks | Dec. 31, 1918 |
| 1,758,997 | Bogard | May 20, 1930 |
| 2,178,869 | Coons | Nov. 7, 1939 |
| 2,220,171 | Noaillon | Nov. 5, 1940 |
| 2,343,646 | Dinley | Mar. 7, 1944 |
| 2,671,053 | Dannenberg | Mar. 2, 1954 |
| 2,698,287 | Bowden et al. | Dec. 28, 1954 |
| 2,703,310 | Kretchmar | Mar. 1, 1955 |
| 2,767,966 | Chave | Oct. 23, 1956 |
| 2,786,406 | White | Mar. 26, 1957 |

FOREIGN PATENTS

| | | |
|---|---|---|
| 850,106 | France | Sept. 4, 1939 |